United States Patent
Shulman et al.

(10) Patent No.: US 7,752,662 B2
(45) Date of Patent: Jul. 6, 2010

(54) METHOD AND APPARATUS FOR HIGH-SPEED DETECTION AND BLOCKING OF ZERO DAY WORM ATTACKS

(75) Inventors: Amichai Shulman, Givataim (IL);
Michael Boodaei, Givataim (IL);
Shlomo Kremer, Tel-Aviv (IL)

(73) Assignee: Imperva, Inc., Foster City, CA (US)

( * ) Notice: Subject to any disclaimer, the term of this patent is extended or adjusted under 35 U.S.C. 154(b) by 1013 days.

(21) Appl. No.: 10/953,557

(22) Filed: Sep. 30, 2004

(65) Prior Publication Data

US 2005/0188215 A1    Aug. 25, 2005

Related U.S. Application Data

(60) Provisional application No. 60/545,928, filed on Feb. 20, 2004.

(51) Int. Cl.
*G06F 12/14* (2006.01)

(52) U.S. Cl. .................................................... 726/22

(58) Field of Classification Search .................. 726/22, 726/23, 24, 25
See application file for complete search history.

(56) References Cited

U.S. PATENT DOCUMENTS

| | | | |
|---|---|---|---|
| 6,453,345 B2 | 9/2002 | Trcka et al. | |
| 7,093,292 B1 * | 8/2006 | Pantuso | 726/23 |
| 7,107,619 B2 * | 9/2006 | Silverman | 726/27 |
| 2003/0005287 A1 * | 1/2003 | Wray et al. | 713/155 |
| 2003/0014662 A1 * | 1/2003 | Gupta et al. | 713/200 |
| 2003/0023873 A1 | 1/2003 | Ben-Itzhak | |
| 2004/0015719 A1 | 1/2004 | Lee et al. | |
| 2004/0019832 A1 | 1/2004 | Arnold et al. | |
| 2004/0034794 A1 * | 2/2004 | Mayer et al. | 713/200 |
| 2005/0005017 A1 * | 1/2005 | Ptacek et al. | 709/229 |

* cited by examiner

*Primary Examiner*—Ellen Tran
(74) *Attorney, Agent, or Firm*—Sughrue Mion, PLLC

(57) ABSTRACT

A method for detection and blocking of zero day worm attacks is disclosed. A zero day worm attack is the initial appearance of a new or revised Web worm. The method compares a hypertext transfer protocol (HTTP) request sent from an attacking computer (or server) to a predefined behavior profile of a protected Web application in order to detect a worm attack. A zero day worm attack based on the first data packet of an HTTP request can be detected.

45 Claims, 3 Drawing Sheets

METHOD AND APPARATUS FOR HIGH-SPEED DETECTION AND BLOCKING OF ZERO DAY WORM ATTACKS

CROSS-REFERENCES TO RELATED APPLICATIONS

This application is an application filed under 35 U.S.C. §111(a), claiming benefit pursuant to 35 U.S.C. §119(e) of the filing date of Provisional Application Ser. No. 60/545,928, which was filed on Feb. 20, 2004, pursuant to 35 U.S.C. §111(b). Provisional Application Ser. No. 60/545,928 is herein incorporated by reference in its entirety.

TECHNICAL FIELD OF THE INVENTION

Apparatuses and methods that relate generally to application and network security protection, and more particularly, to security systems for detecting and blocking zero day worm attacks.

DESCRIPTION OF RELATED ART

The accessibility and convenience of the Internet rapidly changed the way people access information. The World Wide Web ("WWW"), usually referred to as "the Web," is the most popular means for retrieving information on the Internet. The Web gives users access to a vast number of resources from locations around the world. In addition, the Web allows enterprises and organizations to expose their business information and functionality on the Web through software applications, usually referred to as "Web applications." Web servers, e.g., Apache and Microsoft® Internet Information Server (IIS) perform the task of hosting Web applications and Web sites.

A significant problem facing enterprises and the Internet community is that Web applications and Web sites are vulnerable to attacks from malicious, irresponsible or criminally minded individuals or organizations. Many enterprises have invested heavily in security solutions, such as anti-virus software and firewalls, so they can safely use the Web. However, these enterprises remain vulnerable to virulent Web attacks.

Recently, several kinds of malicious worms have threatened Web servers. A worm is a self-contained program, or set of programs, which is able to spread functional copies of itself, or its segments, to other machines (e.g., servers and personal computers) in the network. A worm exploits security flaws in machines connected to the network, thereby propagating across the network. Consequently, active worms can spread rapidly in very little time and infect a large number of machines across the network. For example, the original variant of the Code Red worm infected more than 250,000 machines in only a few hours and caused damage estimated in the billions of dollars. Furthermore, the propagation of active worms enables a malicious party to control millions of machines by launching distributed denial of service attacks, accessing confidential information and destroying valuable data.

The existing worms, e.g., Code Red, Nimda and Nachi, apply the same operational mode to attack Web servers. When attacking a Web server, the worm randomly generates an Internet protocol (IP) address and then attempts to connect to a victim server through the generated IP address. If a connection is established, the attacking worm sends a crafted hypertext transfer protocol (HTTP) request to the victim server. Subsequently, the HTTP request starts the worm code execution for exploiting the server vulnerabilities.

Signature detection is one of the techniques used to detect worm attacks. Signature detection uses a pre-configured set of text patterns that indicates a worm attack. The signature is usually part of the worm-generated HTTP request. For example, the signature of the Code Red worm is: /default.ida?NNNNNNNNNNNNNNNNNNNNNNNNNNN
NNNNNNNNNNNNNNNNNNNNNNN
NNNNNNNNNNNNNNNNNNNNNNNNNNNNNN
NNNNNNNNNNNNNNNNNNNNNNNNNN
NNNNNNNNNNNNNNNNNNNNNNNNNNNNNN
NNNNNNNNNNNNNNNNNNNNNNNNNN
NNNNNNNNNNNNNNNNNNNNNNNNNNNNNN
NNNNNNNNNNNNNNNNNNNNN%u9090%u6858%
ucbd3%u7801%u9090%u6858%ucbd3%u7801%u9090%
u6858%ucbd3%u7801%u9090%u9090%u8190%u00c3%u
0003%u8b00%u531b%u53ff%u0078%u0000%u00=a The disadvantage of signature detection is that only worms, for which signatures exist, can be detected. Typically, a network security company requires several days to identify a new worm's signature and release a signature update that identifies the new worm. Unfortunately, during this identification period, tremendous damage usually occurs.

Allowing the access to a Web application through a single universal resource locator (URL) is another technique for blocking worm attacks. This technique might prevent worms from damaging Web applications, as typically worms access a Web application through a rarely used URL. However, this technique would limit the ability of users to freely use Web applications. For example, a user would not be able to reach a Web application through a bookmark link or the history pages.

Another technique is the protocol anomaly detection that identifies attacks by verifying protocol compliance. Since most Internet protocols are governed by Request For Comments (RFC) specifications, protocol anomaly detection analyzes the incoming messages and looks for deviations from the published RFC specifications. A shortcoming of this technique is the assumption that worm-generated HTTP requests fail to comply with the RFC specification for the HTTP protocol. Since this assumption does not rely on inherent properties of worms and their behavior, protocol anomaly detection is not reliable, not even for worms that take advantage of buffer-overflow exploits.

As can be clearly understood from the related art discussion, a security solution for detecting and blocking of new occurrences of worms is required. Specifically, the security solution should block attacks without any prior knowledge of the worm's signature and without applying any restriction on the protected Web application. It would be therefore advantageous to provide a security solution that efficiently overcomes the shortcomings introduced in the related art.

SUMMARY OF THE INVENTION

The present invention has been made in view of the above circumstances and the exemplary and non-limiting embodiments of the present invention may overcome the above disadvantages and other disadvantages not described above. However, the present invention is not required to overcome the disadvantages described above, and the exemplary and non-limiting embodiments of the present invention may not overcome any of the problems described above.

A first aspect of the present invention relates to a method for A first aspect of the present invention provides a method for detection of zero day worm attacks, wherein the method comprises parsing a received hypertext transfer protocol (HTTP) request to extract an HTTP request parameter, and comparing the extracted HTTP request parameter against a normal behavior profile (NBP) of a protected entity. A NBP comprises a plurality of HTTP profile characteristics. The NBP may comprise a vulnerable directories list (e.g., directory name of a web server's default directory or a frequently accessed directory in the protected entity), a reliable paths list and an accepted hosts list (e.g., hosts that are permitted to access to the protected entity). The reliable paths list may comprise a uniform resource locator (URL) that refers to one or more vulnerable directories.

The extracted HTTP request parameter is compared against the NBP by checking if the URL in the HTTP request is not listed in the reliable paths list, checking if the URL in the HTTP request references a directory in the vulnerable directories list, checking if a host header field in the HTTP request is invalid and checking if the HTTP request does not include a session identifier. A deviation from the NBP is identified if all checks result with an affirmative answer. In addition, the checking if the host header field is invalid involves checking if the host name in the HTTP request is not defined in the accepted hosts list, if the host header field includes an IP address and if the host header field is not included in the HTTP request.

If a deviation from the NBP is identified, an alert indicating a zero day worm attack is generated. The alert is output via a display message, a print message, an electronic mail message and a short message service message. The zero day worm attack can be blocked by dropping packets of the HTTP request.

A second aspect of the present invention provides a computer program product comprising computer-readable media with instructions that enable a computer to implement a method for detection of zero day worm attacks. The computer instructions command a computer to parse an HTTP request to extract an HTTP request parameter and to compare the extracted HTTP request parameter against a NBP of a protected entity.

The computer instructions compare the extracted HTTP request parameter against the NBP by checking if the URL in the HTTP request is not listed in the reliable paths list, checking if the URL in the HTTP request references a directory in the vulnerable directories list, checking if a host header field in the HTTP request is invalid and checking if the HTTP request does not include a session identifier. The computer instructions identify a deviation from the NBP if all checks result with an affirmative answer. In addition, the computer instructions' checking if the host header field is invalid involves checking if the host name in the HTTP request is not defined in the accepted hosts list, if the host header field includes an IP address and if the host header field is not included in the HTTP request.

If the computer instructions identify a deviation from the NBP, an alert indicating a zero day worm attack is generated. The alert is output via a display message, a print message, an electronic mail message and a short message service message. The computer instructions can block the zero day worm attack by dropping packets of the HTTP request.

A third aspect of the invention provides a method for high-speed detection of zero day worm attacks, wherein the method comprises parsing a first data packet belonging to an HTTP request to extract an HTTP request parameter and comparing the extracted HTTP request parameter against a NBP of a protected entity.

The comparing of the extracted HTTP request parameter against the NBP comprises checking if the URL in the HTTP request is not listed in the reliable paths list, checking if the URL in the HTTP request references a directory in the vulnerable directories list and checking if the host name in the first data packet is defined in the accepted hosts list. A deviation from the NBP is identified if all checks result with an affirmative answer.

An alert indicating a zero day worm attack is generated if a deviation from the NBP was identified. The alert is output via a display message, a print message, an electronic mail message and a short message service message. The zero day worm attack can be blocked by dropping packets of the HTTP request.

A fourth aspect of the invention provides a computer program product comprising computer-readable media with instructions that enable a computer to implement a method for high-speed detection of zero day worm attacks. The computer instructions command a computer to parse a first data packet belonging to an HTTP request to extract an HTTP request parameter and to compare the extracted HTTP request parameter against a NBP of a protected entity.

The computer instructions command a computer to compare the extracted HTTP request parameter against the NBP by checking if the URL in the HTTP request is not listed in the reliable paths list, checking if the URL in the HTTP request references a directory in the vulnerable directories list and checking if the host name in the first data packet is defined in the accepted hosts list. A computer instructions identify a deviation from the NBP if all checks result with an affirmative answer.

The computer instructions generate an alert indicating a zero day worm attack if a deviation from the NBP was identified. The alert is output via a display message, a print message, an electronic mail message and a short message service message. The computer instructions command the computer to block zero day worm attack by dropping packets of the HTTP request.

A fifth aspect of the invention provides a security system for detection and blocking of zero day worm attacks. The system comprises network sensors for collecting and normalizing events respective of a web application, and a secure server for building normal behavior profiles and analyzing HTTP requests sent to the web application. The system further comprises connectivity means enabling the plurality of network sensors (e.g., HTTP sensors) to monitor traffic directed to protected network devices.

The security system analyzes each of the data packets comprising the HTTP request. The security system parses the HTTP request to extract an HTTP request parameter and compares the extracted HTTP request parameter against the NBP of the web application. The security system generates an alert indicating a zero day worm attack if a deviation from the NBP was identified. The security system blocks a detected zero day worm attack by dropping packets of the HTTP request.

In one embodiment of the security system, the extracted HTTP request parameter is compared against the NBP by checking if the URL in the HTTP request is not listed in the reliable paths list, checking if the URL in the HTTP request references a directory in the vulnerable directories list and checking if the host name in the first data packet is defined in the accepted hosts list. If all checks are affirmative, a zero day worm attack has been identified. In another embodiment of the security system, the extracted HTTP request parameter is compared against the NBP by checking if the URL in the HTTP request is not listed in the reliable paths list, checking if the URL in the HTTP request references a directory in the vulnerable directories list, checking if a host header field in the HTTP request is invalid and checking if the HTTP request does not include a session identifier. Again, if all checks are affirmative, a zero day worm attack has been identified. Checking if the host header field is invalid involves checking if the host name in the HTTP request is not defined in the accepted hosts list, if the host header field includes an IP address and if the host header field is not included in the HTTP request.

BRIEF DESCRIPTION OF THE DRAWINGS

The aspects of the present invention will become more apparent by describing in detail exemplary, non-limiting embodiments thereof with reference to the accompanying drawings. In the drawings.

DESCRIPTION OF EXEMPLARY EMBODIMENTS

A detailed description of exemplary embodiments will now be given referring to the accompanying drawings.

A zero day worm attack is referred hereinafter to the initial appearance of a new or a revised Web worm and to the Web attack committed by such a worm. The present invention detects zero day worm attacks by comparing a single request sent from an attacking computer (or server) to a predefined profile of a protected Web application. The detection of zero day worm attacks is performed without affecting the overall performance of the protected Web applications.

The detection of zero day worm attacks is based on several common characteristics that are distinguishable from those used by intrusion detection security systems, such as application level security systems. The present invention utilizes the following characteristics to detect an attack: (a) zero day worm attacks use default access points to connect the victim server; typically, such access points are either default directories that are not actually used by the Web applications hosted by the victim server, or directories that contain a limited number of actual application modules; (b) a zero day worm attack does not have an available updated signature in the very first days of the attack; (c) web attacks, and in particularly zero day worm attacks, are usually sent using a single HTTP request to the victim server; this HTTP request is the first request on a new established connection (i.e., HTTP session) between the attacking computer (or server) and the victim server; and, d) victim servers are chosen by their IP addresses, thus, the Host header fields is either empty, contains an IP address or contains an arbitrary string.

In the present invention, for each protected Web application, a normal behavior profile (NBP) is generated. A NBP represents the normal behavior of authorized users. Therefore, the zero day worm attack characteristics described above are not part of the NBP for a protected Web application. In an embodiment of the present invention, an application level security system is utilized for the purpose of generating the NBPs, analyzing incoming requests and comparing the incoming requests to the NBPs.

Figure 1:
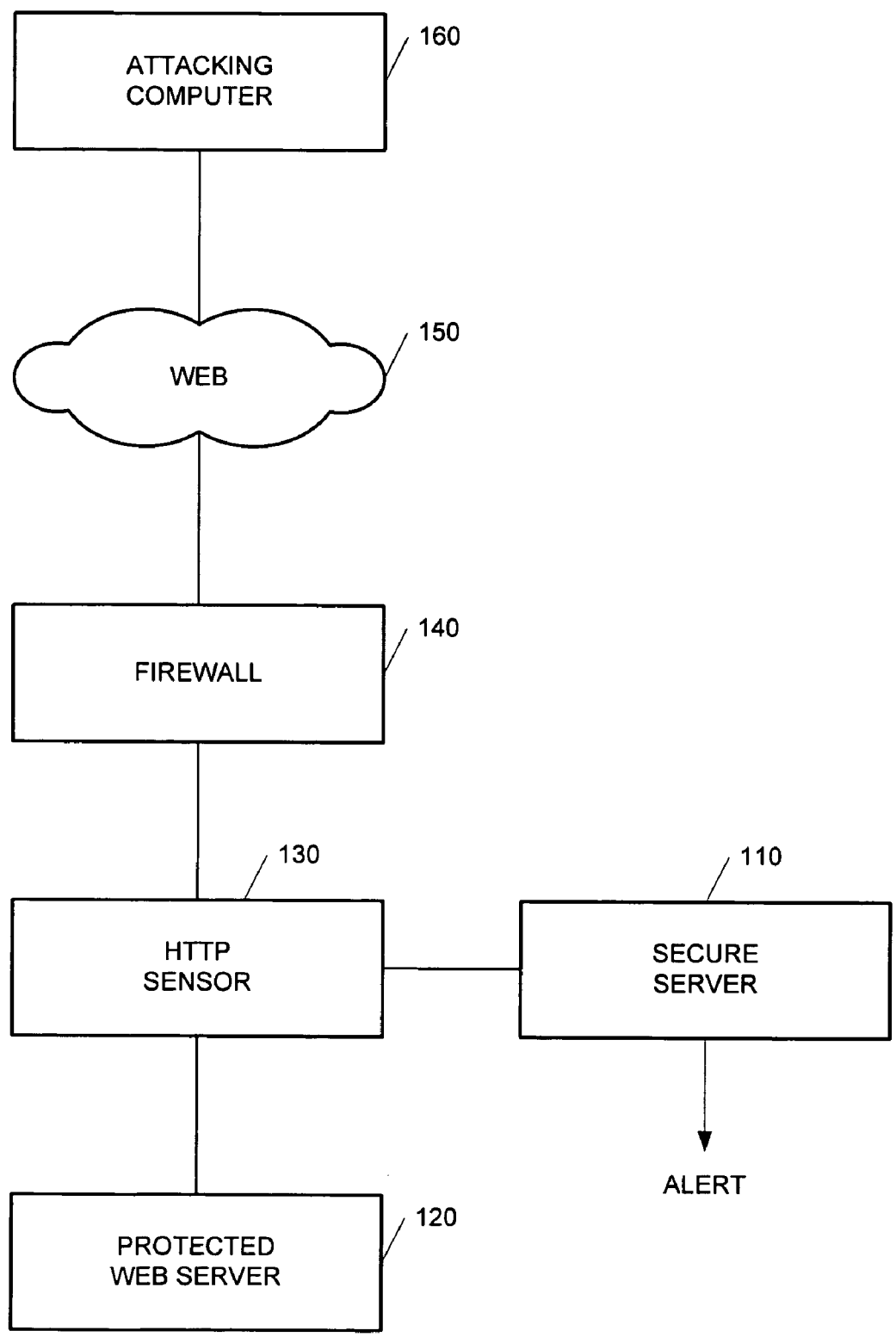
FIG. 1 is an exemplary diagram illustrating the operation of an application level security system.

Referring to FIG. 1, an exemplary diagram illustrating the operation of an application level security system used for protecting a single web server is shown. The security system comprises an HTTP sensor 130 connected to a security server 110. The HTTP sensor 130 is a passive sniffing device that taps, gathers and reconstructs HTTP requests sent to the protected Web server 120 from an attacking computer 160. To allow the fast detection of worm attacks based on single request, the HTTP sensor 130 is configured to operate in the line of traffic, i.e., traffic passing directly through the HTTP sensor 130 to the protected Web server 120.

The HTTP sensor processes incoming HTTP requests and are sent as application events to the secure server 110. The secure server 110 then executes a profiling process that generates the NBPs for the protected Web applications hosted by the Web server 120. A NBP is generated based on a plurality of application events through a learning period defined by a user. The characteristics of a HTTP profile (i.e., a NBP derived from HTTP requests) comprise, but are not limited to, URLs, a host name or host group names to which a designated URL belongs, a HTTP method (e.g., GET or POST) by which a designated URL is called, occurrence (i.e., the exact number of times this URL was seen during learn mode), cookies sent to the client, URL patterns, URL parameters and the constraints of each parameter, HTTP response code and others.

To enable the detection of zero day worm attacks, the HTTP profile comprises a list of vulnerable directories, a list of reliable paths and a list of accepted hosts. The vulnerable directories list comprises is a preconfigured list of known default directories that exist on most installations of a typical web server. Worms usually attack these directories. For example, a vulnerable directory may be a root directory, a cgi-bin directory, a winnt directory, a scripts directory or other directory types. This list is not a result of the learning process, in that the vulnerable directories list is not derived from the behavior of a Web application.

The reliable paths list comprises those URLs in each vulnerable directory that are actually accessed by users of the Web application. If the protected Web server 120 does not include any of the directories designated in vulnerable directories list, the reliable paths list may be an empty list. The accepted hosts list contains the host names through which the users can access the protected Web application. This list is restricted to actual host names, and not IP addresses.

To protect the Web server 120 from zero day worm attacks, the security system analyzes each incoming HTTP request and identifies deviations from the generated NBPs as will be described in greater detail below. If a deviation is detected, then the incoming HTTP request is blocked by dropping the offending packet or request.

The present invention provides two embodiments for high-speed detection and blocking of zero day worm attacks. In a first embodiment, the entire HTTP request is analyzed, while in a second embodiment only the first data packet (e.g., transmission control protocol (TCP) packet) of the HTTP request is analyzed. Each of these embodiments uses a different set of criteria to identify deviations from the NBPs.

Figure 2:
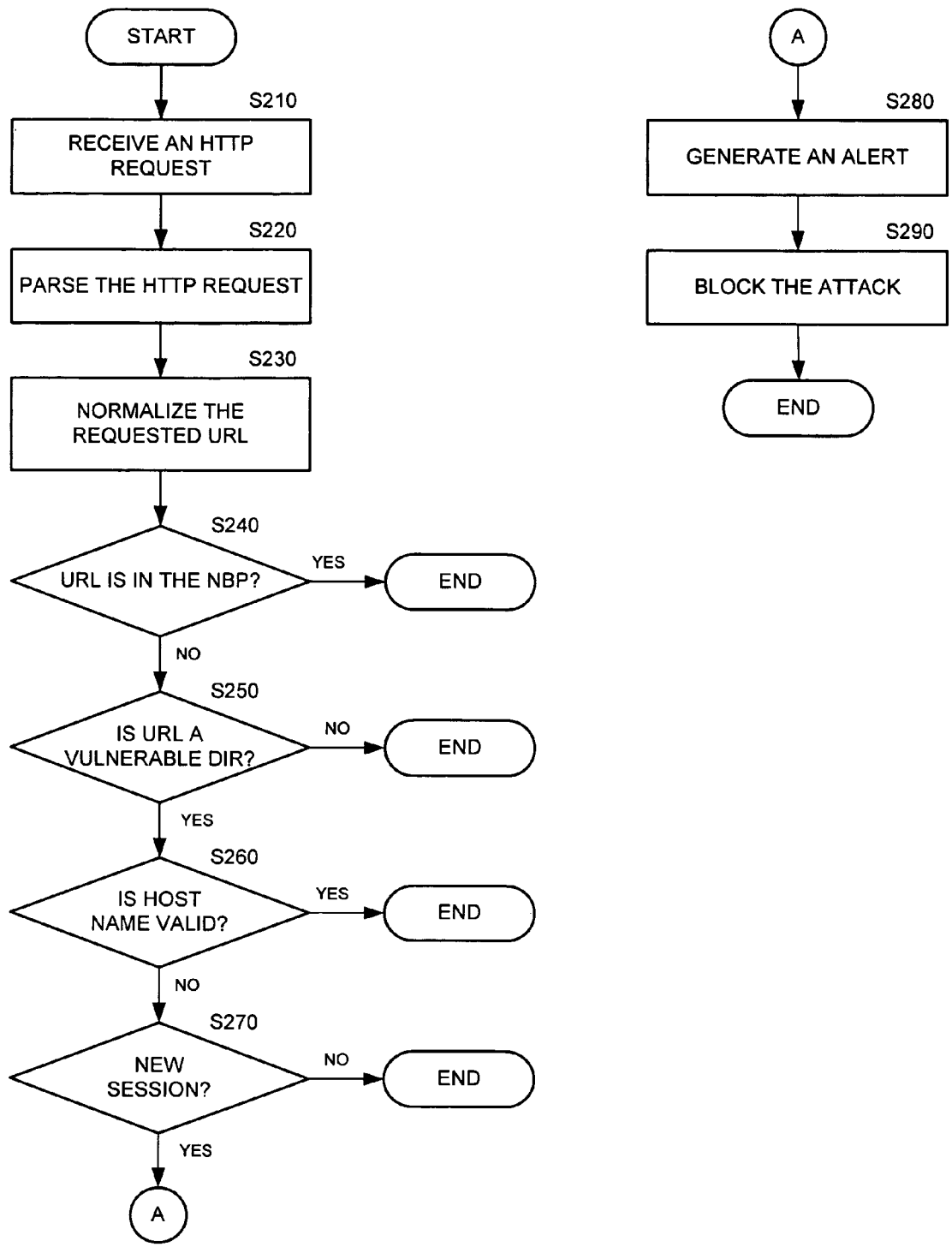
FIG. 2 is a non-limiting flowchart describing the method for detecting and blocking of zero day worm attacks in accordance with a first embodiment of the present invention.

Referring to FIG. 2, a non-limiting flowchart describing the method for detecting and blocking of zero day worm attacks in accordance with an exemplary embodiment of this invention is shown. The method uses the NBP of a protected Web application to identify deviations from normal behavior. To ensure an effective protection, the NBP ought to comprise the list of vulnerable directories, the list of reliable paths and the list of accepted hosts.

At S210, a HTTP request is received at a HTTP sensor 130. The HTTP protocol is a request/response protocol. A client sends a request, including the request method (e.g., GET or POST), the URL, the host name and other protocol parameters. The server responds with a status line, including a success or error code, server information, and possible entity-body content. At S220, a complete parsing of the received HTTP request is performed, i.e., each of the data packets that comprise the HTTP request is parsed. Parsing the entire incoming HTTP request ensures the detection of attacks utilizing IP fragmentation techniques. The HTTP request is parsed for the purpose of determining the requested URL, host name and the current HTTP session. Each HTTP request that is generated, for example by a browser, includes a special header called a host header field. For instance, if the attacking computer (or server) accesses http://www.imperva.com/partners/contact.html, a request for the URL "/partners/contact.html" is sent. The request contains a host header field with the name "www.imperva.com". At S230, the requested URL is decoded, thus transforming extended representations of characters to their actual ASCII representation, e.g., decoding the string "%20" to the space (ASCII 32) character. In addition, the requested URL is normalized to remove redundant or non-exist directories. For example, the URL "/nonexistent dir/../cgi-bin/contact.html" is normalized to "/cgi-bin/contact.html". This simplifies the comparison process in later stages.

At S240, a check is made to determine if the requested URL is part of the normal access profile for the protected application, i.e., if the requested URL is included in the NBP. If so, execution ends. Otherwise, execution continues with S250, where a determination is made as to whether the requested URL references a directory found in the vulnerable directories list. If S250 yields an affirmative answer, execution continues to S260; otherwise, execution ends. At S260, a determination is made as to whether the host name in the host header field is valid. Specifically, at least one of the following conditions must be satisfied: (i) the host header field is not designated in the incoming HTTP request, i.e., the host header field is empty, (ii) the host name is an IP address or (iii) the host name in not included in the accepted hosts list. If at least one of these conditions is satisfied, execution continues to S270; otherwise, execution ends.

At S270, a determination is made as to whether the received request does not belong to a previously established user session. Specifically, the received request is checked to see if it is the first HTTP request of a new session or does not contain a session identifier. If the HTTP request belongs to a previously established session, the execution ends. Otherwise, the execution continues to S280 where an alert is generated, indicating a detection of an attack. The alert can be displayed to the user or sent, for example, as an e-mail message or as a short message service (SMS) message. An HTTP request detected as a zero day worm attack can be further used for identifying the attack signature. At S290, the attack is blocked by dropping the offending packet or request.

An example demonstrating the detection of the Nimda worm in accordance with the present invention follows. Although, the Nimda worm is not considered to be a zero day worm attack anymore, zero day worm attacks may utilize the same techniques used by the Nimda worm. One of the HTTP requests generate by the Nimda worm is:

"GET/scripts/..%5c../winnt/system32/cmd.exe?/c+dir".

The URL in the request, i.e., "/scripts/..%5c../winnt/system32/cmd.exe?/c+dir" is decoded and normalized to "/winnt/system32/cmd.exe?/c+dir". The URL references to the "winnt" directory, which is always included in a vulnerable directories list. In addition, the HTTP request contains the "cmd.exe" string. This indicates that the attacker is attempting to execute operating system commands on the Web server. A person skilled in the art would be cognizant of the fact that a NBP for a web application would not include this command. Hence, such a request would be blocked.

Figure 3:
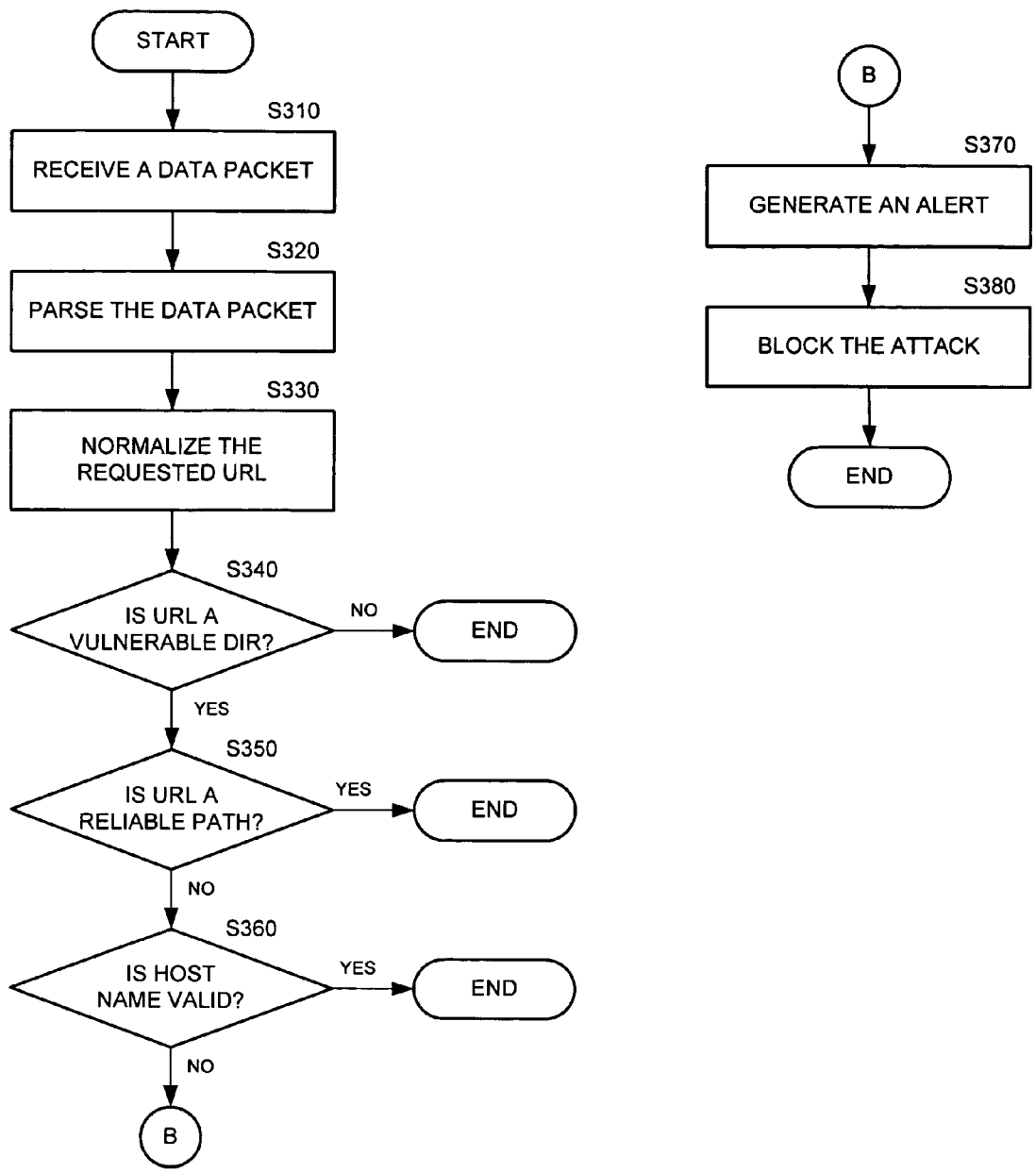
FIG. 3 is a non-limiting flowchart describing the method for detecting and blocking of zero day worm attacks analyzing in accordance with a second embodiment of the present invention.

Referring to FIG. 3, a non-limiting flowchart describing another exemplary embodiment for detection and blocking of zero day worm attacks is shown. This method detects zero day worm attacks based on the first data packet (e.g., a TCP packet) of a newly established HTTP connection. Usually, HTTP communications take place over TCP/IP connections, thus an HTTP request is received as multiple successive TCP/IP packets. The blocking method compares specific criteria in an incoming data packet to a NBP of a protected Web application. In order to ensure an effective protection, the NBP ought to comprise the list of vulnerable directories, the list of reliable paths and the list of accepted hosts, as described in detail above.

At S310, a first data packet of an HTTP request is received. At S320, the received data packet is parsed for extracting the requested URL and host name. Optionally, at S330, the extracted URL is decoded and normalized as described above. At S340, the extracted URL is matched against the vulnerable directories list and if a match is not found, then execution ceases. If a match is found in the vulnerable directories list, then, at S350, the URL is further matched against the reliable paths list. If the URL match is found in the reliable paths list, then execution ends. If a match is not found, then execution continues to S360. At S360, a determination is made as to whether a host name designated in the data packet is included in the accepted hosts list. If the host name is matched in the accepted hosts list, then execution ends. If no match is found, then execution continues to S370, where an alert indicating on a detected attack is generated.

The alert can be displayed to the user or sent, for example, as an e-mail message or a SMS message. At S380, the attack is blocked according to one of the pre-configured security policies described above. In addition, if there is a failure to extract all the HTTP parameters from an incoming packet, an alert is generated.

It should be appreciated by a person skilled in the art that, by analyzing only a single data packet, an accelerated detection is achieved. In fact, the time required to execute the detection process is linearly proportionate to the size of the inspected data packet in a single pass.

The exemplary embodiments can be implemented in software, hardware, firmware or various combinations thereof. In an embodiment, the elements are implemented in software that is stored in a memory and that configures and drives a digital processor situated in the respective wireless device. The software can be stored on any computer-readable media for use by or in connection with any suitable computer-related system or method. It will be appreciated that the term "predetermined operations" and the term "computer system software" mean substantially the same thing for the purposes of this description. It is not necessary that the memory and the processor be physically located in the same place. That is to say, it is foreseen that the processor and the memory might be in different physical pieces of equipment or even in geographically distinct locations.

As used herein, one of skill in the art will appreciate that "media" or "computer-readable media" may comprise a diskette, a tape, a compact disc, an integrated circuit, a cartridge, or any other tangible media useable by computers. Other transmission media may include a remote transmission via a communications circuit. For example, to distribute computer system software, the supplier might provide a diskette or might transmit the instructions for performing predetermined operations in some form via satellite transmission, via a direct telephone link, or via the Internet. More specific examples of computer-readable media would comprise an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CD-ROM) (optical). The computer readable media could even be paper or another suitable media upon which the program is printed, as the program can be electronically captured via, for instance, optical scanning of the paper or other media, then compiled, interpreted or otherwise processed in a suitable manner if necessary, and then stored in a computer memory.

Although computer system software might be "written on" a diskette, "stored in" an integrated circuit, or "carried over" a communications circuit, it will be appreciated that, for the purposes of this discussion, the computer usable media will be referred to as "bearing" the instructions for performing the predetermined operations. Thus, the term "bearing" is intended to encompass the above and all equivalent ways in which instructions for performing predetermined operations are associated with a computer usable media.

Therefore, for the sake of simplicity, the term "program product" is hereafter used to refer to a computer useable media, as defined above, which bears instructions for performing predetermined operations in any form.

While only exemplary embodiments have been specifically described herein, it is contemplated that numerous modifications may be made to the exemplary embodiments of the invention without departing from the spirit and scope of the exemplary embodiments of the present invention as defined in the following claims. Further, acronyms are used merely to enhance the readability of the specification and claims. It should be noted that these acronyms are not intended to lessen the generality of the terms used and they should not be construed to restrict the scope of the claims to the exemplary embodiments described therein.

What is claimed is:

1. A method for detection of zero day worm attacks on a protected web application, wherein the method comprises:
    parsing a hypertext transfer protocol (HTTP) request received by the protected web application to extract at least one HTTP request parameter;
    comparing the at least one extracted HTTP request parameter against a normal behavior profile (NBP) of the protected web application comprises:
        checking if the URL in the HTTP request of the protected web application is not listed in the reliable paths list;
        checking if the URL in the HTTP request of the protected web application references a directory in the vulnerable directories list;
        checking if a host header field in the HTTP request of the protected web application is invalid;
        checking if the HTTP request of the protected web application does not include a session identifier;
        checking if the HTTP request of the protected web application belongs to a previously established session;
    wherein a deviation from the NBP of protected web application is identified if, all checks result with an affirmative answer;
    a deviation from NBP identifies a zero day worm attack; and generating an alert indicating a zero day worm attack if a deviation from the NBP is identified, wherein the zero day attack is an initial appearance of a web worm.

2. The method of claim 1, wherein the vulnerable directories list comprises at least one directory name of a default directory of the web server of the protected web application.

3. The method of claim 1, wherein a user pre-configures the vulnerable directories list of the protected web application.

4. The method of claim 1, wherein the reliable paths list of the protected web application comprises at least one uniform resource locator (URL) that refers to at least one of the vulnerable directories of the protected web application.

5. The method of claim 1, wherein the accepted hosts list comprises at least one host name permitted to access to the protected web application.

6. The method of claim 1, wherein checking if the host header field is invalid further comprises: checking if the host name in the HTTP request of the protected web application is not defined in the accepted hosts list of the protected web application, if the host header field includes an IP address and if the host header field is not included in the HTTP request of the protected web application.

7. The method of claim 1, wherein the HTTP request parameter is at least one of a URL, a host name and a session identifier.

8. The method of claim 1, wherein the parsing the HTTP request further comprises decoding the at least one extracted HTTP request parameter.

9. The method of claim 1, wherein the alert is output via a display message, a print message, an electronic mail message and a short message service message.

10. The method of claim 1, wherein the method further comprises blocking the zero day worm attack on the protected web application by dropping packets of the HTTP request.

11. A computer program product comprising computer-readable media with instructions that enable a computer to implement a method for detection of zero day worm attacks on a protected web application, wherein the method comprises:
    parsing a hypertext transfer protocol (HTTP) request received by the protected web application to extract at least one HTTP request parameter;
    comparing the at least one extracted HTTP request parameter against a normal behavior profile (NBP) of the protected web application comprises:
        checking if the URL in the HTTP request of the protected web application is not listed in the reliable paths list;
        checking if the URL in the HTTP request of the protected web application references a directory in the vulnerable directories list;
        checking if a host header field in the HTTP request of the protected web application is invalid;
        checking if the HTTP request of the protected web application does not include a session identifier;
        checking if the HTTP request of the protected web application belongs to a previously established session;
    wherein a deviation from the NBP of protected web application is identified if, all checks result with an affirmative answer;
    a deviation from NBP identifies a zero day worm attack; and
    generating an alert indicating a zero day worm attack if a deviation from the NBP is identified.

12. The computer program product of claim 11, wherein the vulnerable directories list of the protected web application comprises at least one directory name of a frequently accessed directory in the protected web application.

13. The computer program product of claim 11, wherein a user pre-configures the vulnerable directories list of the protected web application.

14. The computer program product of claim 11, wherein the reliable paths list of the protected web application comprises at least one uniform resource locator (URL) that refers to at least one of the vulnerable directories of the protected web application.

15. The computer program product of claim 11, wherein the accepted hosts list comprises at least one host name permitted to access to the protected web application.

16. The computer program product of claim 11, wherein checking if the host header field is invalid further comprises checking if the host name in the HTTP request of the protected web application is not defined in the accepted hosts list of the protected web application, if the host header field includes an IP address and if the host header field is not included in the HTTP request of the protected web application.

17. The computer program product of claim 11, wherein the at least one extracted HTTP request parameter is at least one of a URL, a host name and a session identifier.

18. The computer program product of claim 11, wherein parsing the HTTP request comprises decoding the at least one extracted HTTP request parameter.

19. The computer program product of claim 11, wherein the alert is output via a display message, a print message, an electronic mail message and a short message service message.

20. The computer program product of claim 11, wherein the method further comprises blocking the zero day worm attack on the protected web application by dropping packets of the application protocol request.

21. A method for high-speed detection of zero day worm attacks on a protected web application, wherein the method comprises:
    parsing a first data packet belonging to a hypertext transfer protocol (HTTP) request to the protected web application to extract at least one HTTP request parameter;
    comparing the at least one extracted HTTP request parameter against a normal behavior profile (NBP) of the protected web application comprises:
        checking if the URL in the HTTP request of the protected web application is not listed in the reliable paths list;
        checking if the URL in the HTTP request of the protected web application references a directory in the vulnerable directories list;
        checking if a host header field in the HTTP request of the protected web application is invalid;
        checking if the HTTP request of the protected web application does not include a session identifier;
        checking if the HTTP request of the protected web application belongs to a previously established session;
    wherein a deviation from the NBP of protected web application is identified if, all checks result with an affirmative answer;
    a deviation from NBP identifies a zero day worm attack; and
    generating an alert indicating a zero day worm attack if a deviation from the NBP was identified, wherein the zero day attack is an initial appearance of a web worm.

22. The method of claim 21, wherein the vulnerable directories list of the protected web application comprises at least one directory name of a default directory of the web server.

23. The method of claim 21, wherein a user pre-configures the vulnerable directories list of the protected web application.

24. The method of claim 21, wherein the reliable paths list of the protected web application comprises at least one uniform resource locator (URL) that refers to at least one of the vulnerable directories of the protected web application.

25. The method of claim 21, wherein the accepted hosts list of the protected web application comprises at least one host name permitted to access to the protected web application.

26. The method of claim 21, wherein the at least one extracted HTTP request parameter is at least one of a URL, a host name and a session identifier.

27. The method of claim 21, wherein parsing the at least one extracted HTTP request comprises decoding the at least one extracted HTTP request parameter.

28. The method of claim 21, wherein the alert is output via a display message, a print message, an electronic mail message and a short message service message.

29. The method of claim 21, wherein the method further comprises blocking the zero day worm attack by dropping packets of the HTTP request.

30. A computer program product comprising computer-readable media with instructions that enable a computer to implement a method for detection of zero day worm attacks on a protected web application, wherein the method comprises:
    parsing a first data packet belonging to a hypertext transfer protocol (HTTP) request to the protected web application to extract at least one HTTP request parameter;
    comparing the at least one extracted HTTP request parameter against a normal behavior profile (NBP) of the protected web application comprises:
        checking if the URL in the HTTP request of the protected web application is not listed in the reliable paths list;
        checking if the URL in the HTTP request of the protected web application references a directory in the vulnerable directories list;
        checking if a host header field in the HTTP request of the protected web application is invalid;
        checking if the HTTP request of the protected web application does not include a session identifier;
        checking if the HTTP request of the protected web application belongs to a previously established session;
    wherein a deviation from the NBP of protected web application is identified if, all checks result with an affirmative answer;
    a deviation from NBP identifies a zero day worm attack; and
    generating an alert indicating a zero day worm attack if a deviation from the NBP was identified.

31. The computer program product of claim 30, wherein the vulnerable directories list of the protected web application comprises at least one directory name of a frequently accessed directory in the protected web application.

32. The computer program product of claim 30, wherein a user pre-configures the vulnerable directories list of the protected web application.

33. The computer program product of claim 30, wherein the reliable paths list of the protected web application comprises at least one uniform resource locator (URL) that refers to at least one of the vulnerable directories of the protected web application.

34. The computer program product of claim 30, wherein the accepted hosts list of the protected web application comprises at least one host name permitted to access to the protected web application.

35. The computer program product of claim 30, wherein parsing the HTTP request comprises decoding the at least one extracted HTTP request parameter.

36. The computer program product of claim 30, wherein the alert is output via a display message, a print message, an electronic mail message and a short message service message.

37. The computer program product of claim 30, wherein the method further comprises blocking the zero day worm attack by dropping packets of the HTTP request.

38. A security system for detection and blocking of zero day worm attacks on a protected web application, comprising:

at least one network sensors for collecting and normalizing events respective of the protected web application;

a secure server for building normal behavior profiles of protected web applications and analyzing hypertext transfer protocol (HTTP) requests sent to the protected web application comprises:

checking if the URL in the HTTP request of the protected web application is not listed in the reliable paths list;

checking if the URL in the HTTP request of the protected web application references a directory in the vulnerable directories list;

checking if a host header field in the HTTP request of the protected web application is invalid;

checking if the HTTP request of the protected web application does not include a session identifier;

checking if the HTTP request of the protected web application belongs to a previously established session;

wherein a deviation from the NBP of protected web application is identified if, all checks result with an affirmative answer;

a deviation from NBP identifies a zero day worm attack; and connectivity means enabling the plurality of network sensors to monitor traffic directed to the protected web applications.

39. The security system of claim 38, wherein the network sensor is at least an HTTP sensor.

40. The security system of claim 38, wherein analyzing an HTTP request further comprises analyzing each of the data packets comprising the HTTP request of the protected web application.

41. The security system of claim 40, wherein analyzing the HTTP request further comprises:

parsing the HTTP request to extract at least one HTTP request parameter; comparing the at least one extracted HTTP request parameter against the NBP of the web application; and generating an alert indicating a zero day worm attack if a deviation from the NBP was identified.

42. The security system of claim 41, wherein parsing HTTP request further comprises generating the alert if the HTTP parameters cannot be extracted from the data packet.

43. The security system of claim 41, wherein the at least one extracted HTTP request parameter is at least one of a URL, a host name and a session identifier.

44. The security system of claim 41, wherein a detected zero day worm attack is blocked by dropping packets of the HTTP request.

45. The security system of claim 38, wherein checking if the host header field is invalid further comprises checking if the host name in the HTTP request of the protected web application is not defined in the accepted hosts list of the protected web application, if the host header field includes an IP address and if the host header field is not included in the HTTP request of the protected web application.

* * * * *